June 12, 1956

T. R. HARRISON 2,749,745

MEASURING APPARATUS FOR THE DEGREE OF
SUPERSATURATION OF SOLUTIONS

Filed Nov. 12, 1954

INVENTOR.
THOMAS R. HARRISON
BY Arthur H. Swanson
ATTORNEY.

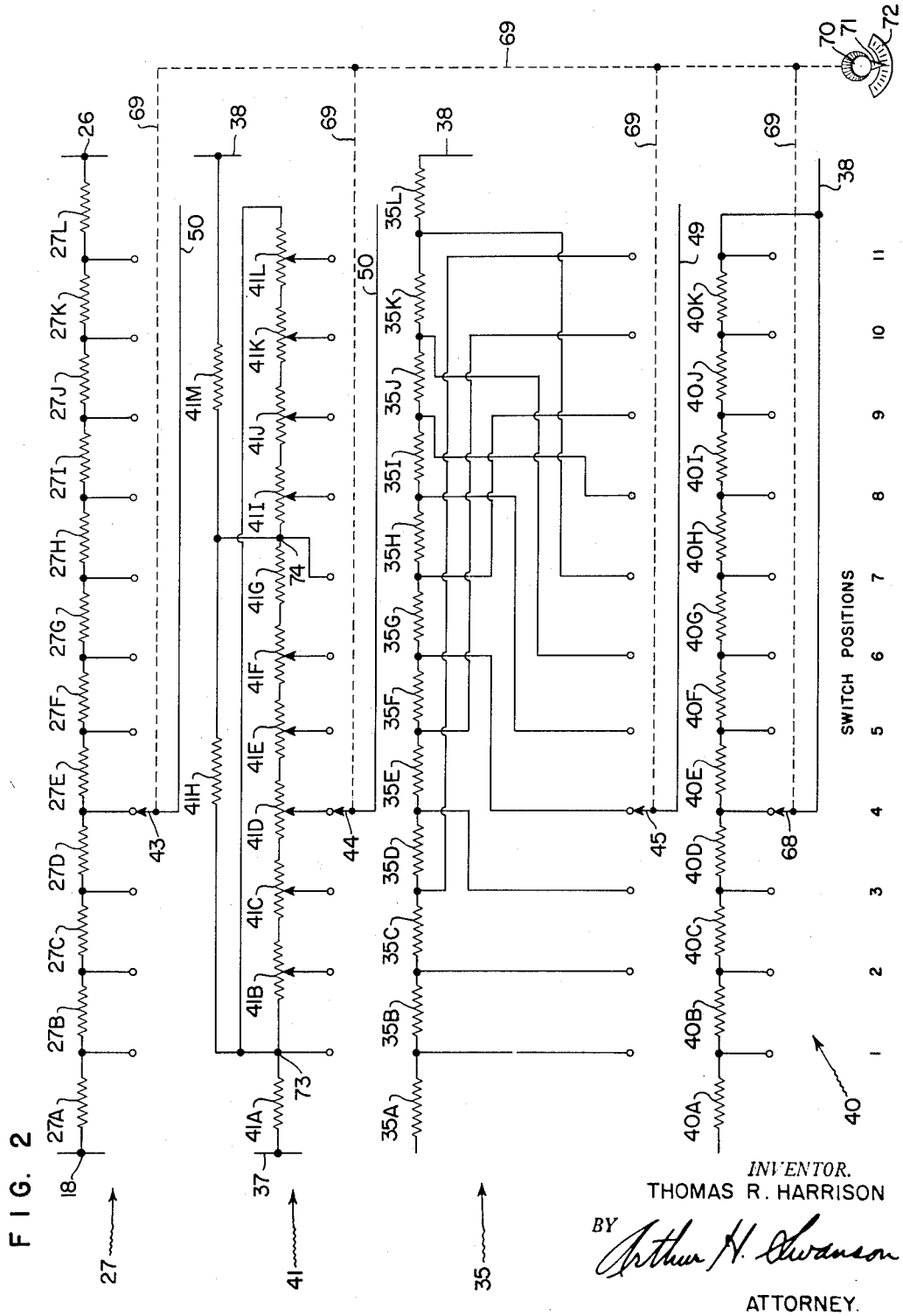

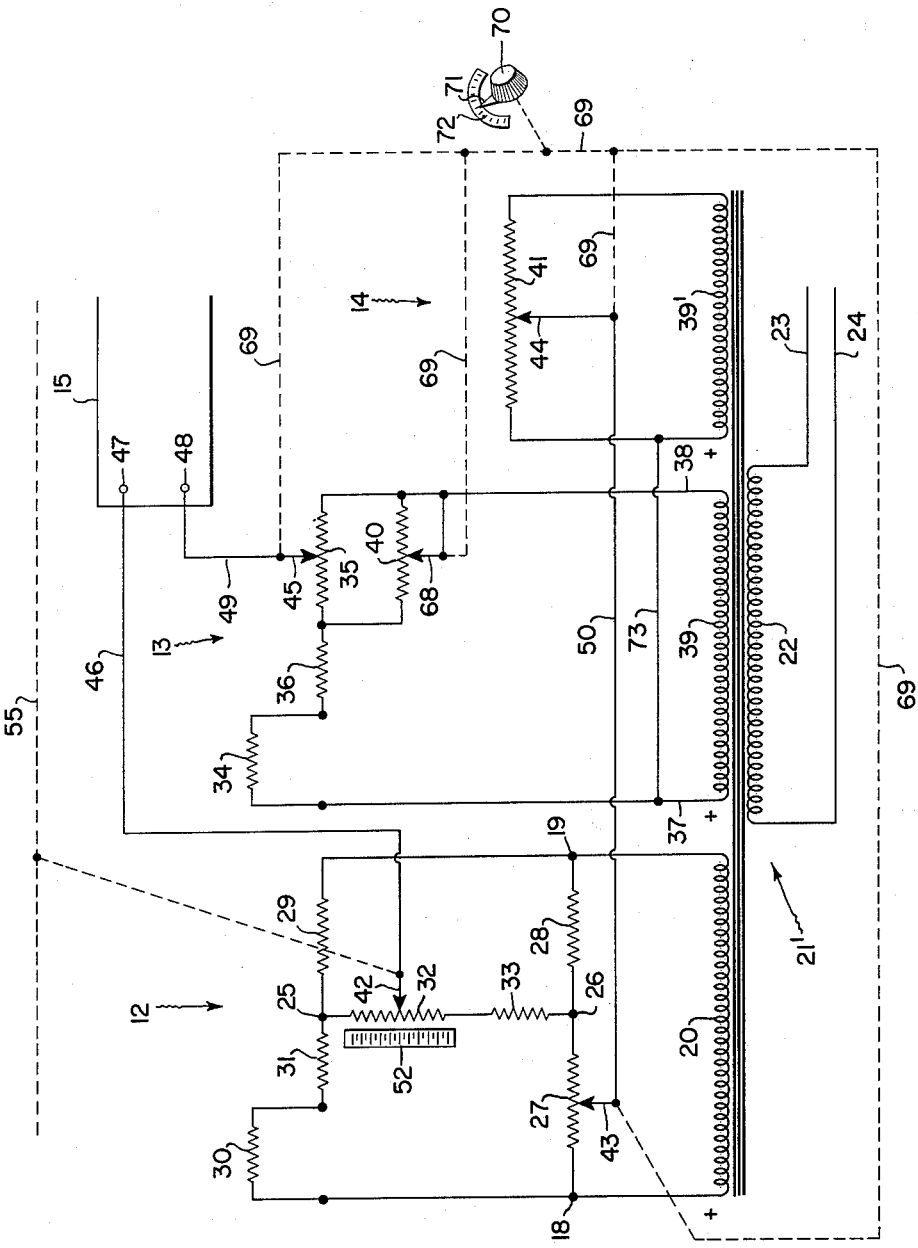

United States Patent Office 2,749,745
Patented June 12, 1956

2,749,745

MEASURING APPARATUS FOR THE DEGREE OF SUPERSATURATION OF SOLUTIONS

Thomas R. Harrison, Wyncote, Pa., assignor to Minneapolis-Honeywell Regulator Company, Minneapolis, Minn., a corporation of Delaware Application November 12, 1954, Serial No. 468,242

11 Claims. (Cl. 73—53)

The present invention relates broadly to apparatus for measuring the degree of supersaturation of solutions, and relates specifically to novel electrical apparatus for measuring the degree of supersaturation of boiling sugar solutions. More specifically, the invention relates to improved apparatus of the type specified comprising novel means for adjusting the apparatus in accordance with the purity of the solution whose supersaturation is to be measured.

A general object of the present invention is to provide novel electrical apparatus arranged to measure the degree of supersaturation of solutions, such as boiling sugar solutions. More specifically, it is an object of the invention to provide improved supersaturation measuring apparatus, of the type including an electrical bridge circuit and cooperating resistance thermometer elements which are respectively responsive to the temperature of a boiling solution and to the temperature of the solution solvent boiling at the same pressure as the solution, wherein there are included means to permit the apparatus to be readily adjusted in accordance with the purity of the solution.

A more specific object of the present invention is to provide apparatus of the type just specified which incorporates a novel circuit arrangement including means for permitting the proper adjustment of a plurality of different circuit portions of the apparatus in accordance with the purity of the solution whose supersaturation is to be measured.

A still more specific object of the invention is to provide apparatus as specified above including a plurality of interconnected circuits characterized by the inclusion of at least one separate slide wire resistor and cooperating contact in each circuit, said contacts being adjustable simultaneously and adapted for simultaneous adjustment in accordance with the purity of the associated solution.

As is well known in the sugar refining art, the degree of supersaturation of a boiling sugar solution is an important index and a valuable tool in the proper performance of the sugar refining process, and reliable apparatus for measuring the degree of supersaturation is necessary if proper operation of the sugar refining equipment is to be had. It is also well known, however, that the supersaturation measurements obtained with apparatus of the general type described above are dependent upon the purity of the associated solution as well as on the actual supersaturation thereof, this purity being defined as the percentage of the desired substance, such as sugar, in the total solute of the solution. Accordingly, if such apparatus is to provide accurate measurements of the supersaturation of solutions of different purities, that apparatus must include means by which it can be adjusted in accordance with the solution purity.

The only arrangements for providing such purity adjustments in supersaturation or concentration measuring apparatus with which I am familiar are those disclosed in the several Alfred L. Holven Patents Nos. 2,135,511, 2,135,512, 2,135,513, and 2,263,847. However, each of these previously known purity adjustment arrangements is subject to the disadvantage of either being unduly complex or failing to provide satisfactory purity compensation.

Accordingly, a prime object of the present invention is to provide novel supersaturation measuring apparatus including novel and effective means through which different portions of the apparatus may be simultaneously adjusted in the proper relative manner in accordance with the particular degree of purity of the solution under measurement at any given time, thereby to make possible accurate and reliable measurements of the supersaturation of solutions having different purities.

In accordance with the present invention, the novel supersaturation measuring apparatus thereof comprises a first circuit portion in the form of a bridge circuit having in one of its arms a first resistance thermometer element which is adapted to be exposed to the temperature of a boiling solution whose degree of supersaturation is to be measured. The other arms of the bridge respectively include first, second, and third resistors, and a fourth resistor is connected between the output terminals of the bridge. The input terminals of the bridge are connected across a source of energizing voltage.

The apparatus also comprises a second circuit portion including a second resistance thermometer element adapted to be exposed to the temperature of the solvent of said solution boiling at substantially the same pressure as said solution. This second element is connected in series with a fifth resistor across a source of energizing voltage, and a sixth resistor is connected in parallel with at least a portion of the fifth resistor. A seventh resistor of the apparatus is connected in a third circuit portion across a source of energizing voltage.

The foregoing circuit portions and elements are interconnected in such a manner that the apparatus may be readily adjusted in accordance with the purity of the solution under measurement. Specifically, each of the aforementioned first, fifth, and seventh resistors is provided with an individual adjustable contact which is included in the interconnections between the circuit portions of the apparatus. Further, the aforementioned sixth resistor has an adjustable contact which is connected to one end of this resistor. The four adjustable contacts just enumerated are so arranged and related, and are so mechanically interconnected, that the manipulation of a single purity adjusting knob, included in apparatus, to a position corresponding to the then existing value of the purity of the solution automatically adjusts both the relative and absolute positions of the four adjustable contacts in the manner necessary to cause the apparatus to perform its supersaturation measuring function properly under the influence of the then existing value of solution purity.

In one form of the apparatus of the invention, the second and third circuit portions are connected across and energized by the same source of energizing voltage. In another form, the second and third circuit portions are connected across and energized by separate energizing voltage sources. In each of these forms, however, the arrangement of the several adjustable contacts remains essentially the same.

Once the apparatus has been properly adjusted in accordance with the purity of the solution under measurement, the adjusted position of a contact adjustable on said fourth resistor provides a measure of the solution supersaturation when a current detector connected in series with the last mentioned contact indicates a zero current flow. This adjustment of the fourth resistor contact for zero current flow may be made manually, or may be made automatically by the current detector.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which are illustrated and described preferred embodiments of the invention.

Of the drawings:

Fig. 2 is a diagrammatic representation of the details of the purity adjusting means of the apparatus of Fig. 1; and Fig. 3 is a diagrammatic representation of a modification of the apparatus shown in Fig. 1.

Figure 1:
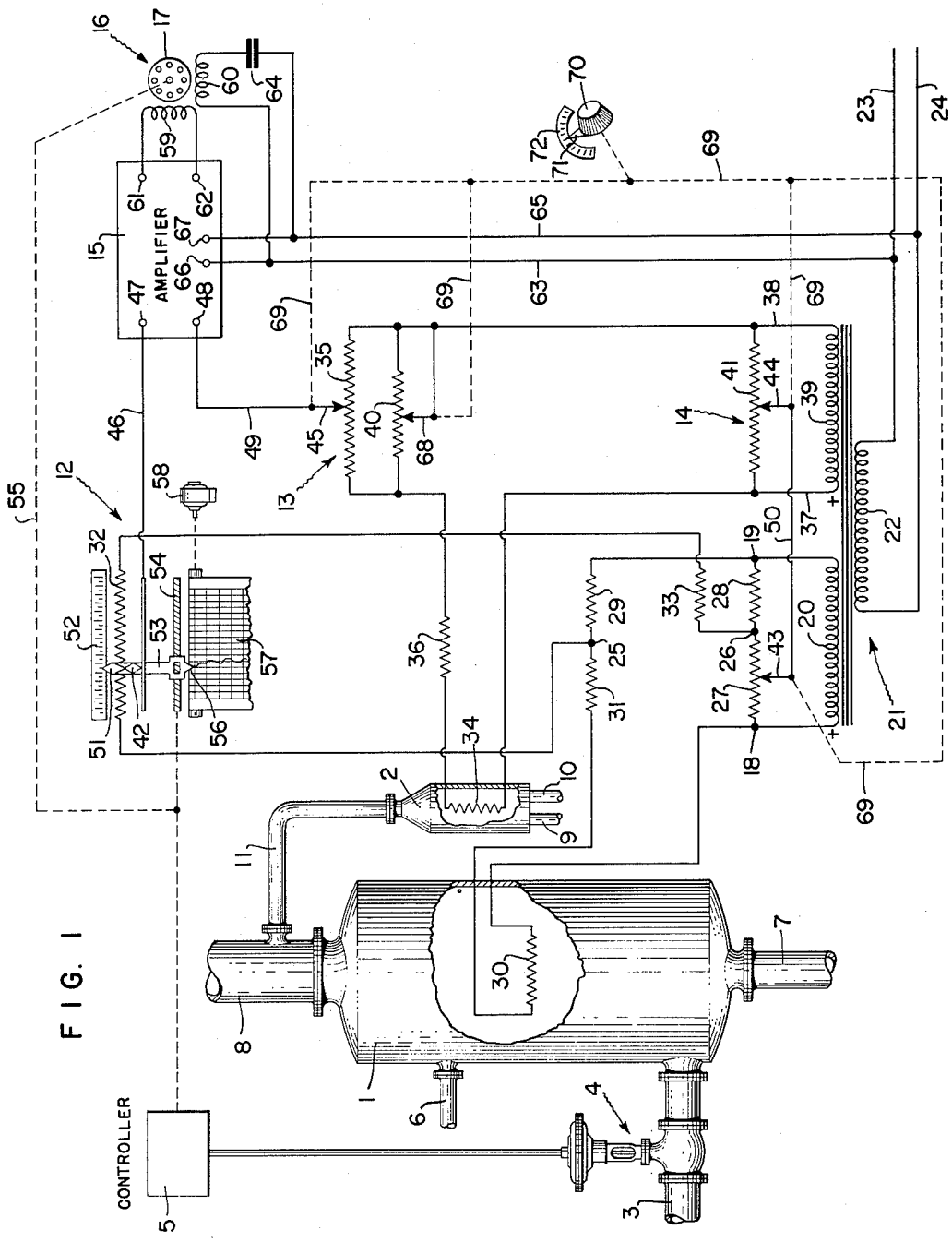
Fig. 1 is a diagrammatic representation of supersaturation measuring and controlling apparatus according to the present invention as applied to sugar boiling apparatus.

The apparatus illustrated by way of example in Fig. 1 comprises a form of my novel supersaturation measuring and controlling apparatus associated with a sugar boiling system. This system includes a vacuum pan 1 and a pilot pan 2. Each of these pans is shown as being of conventional form. Thus, the vacuum pan 1 is provided with a sugar solution inlet connection 3 through which sugar solution passes into the lower portion of the pan 1 at a rate dependent upon the adjustment of a valve 4 which is subjected to opening and closing adjustments by a controller 5. The pan 1 is also provided with a steam inlet connection 6, a sugar outlet connection 7, and a vacuum connection 8.

The pilot pan 2 is provided with steam and water connections 9 and 10, respectively, and with a vacuum connection 11. The latter communicates with the vacuum connection 8 of the vacuum pan, whereby the sugar solution boiling in the vacuum pan 1 and water boiling in the pilot pan 8 are caused to boil under the same sub-atmospheric pressure, in the known manner. The connections 9 and 10 to the pilot pan 2 maintain the proper level of boiling water in the pan 2.

The novel supersaturation measuring apparatus associated with the pans 1 and 2 comprises a first circuit portion 12, a second circuit portion 13, and a third circuit portion 14. Also included in this apparatus is a current detector comprising an amplifier 15 and a reversible electric motor 16. The amplifier 15 is arranged to cause the rotor 17 of the motor 16 to rotate in one direction or the other depending upon the phase of an alternating current signal applied to the input of the amplifier 15, and to cause the rotor 17 to remain stationary when no signal is applied to the amplifier input.

The circuit portion 12 is in the form of a bridge circuit having input or energizing termnials 18 and 19 which are connected across a source of alternating energizing voltage, shown as the secondary winding 20 of a transformer 21. The latter is provided with a primary winding 22 which is energized by virtue of its connection between alternating current supply conductors 23 and 24.

The circuit portion 12 also includes bridge output terminals 25 and 26, a plurality of bridge arm resistors interconnecting the energizing terminals 18 and 19 and the output terminals 25 and 26. Thus, a first resistor 27 is connected between the energizing terminal 18 and the output terminal 26, while a second resistor 28 is connected between the energizing terminal 19 and the output terminal 26. A third resistor 29 is connected between the energizing terminal 19 and the output terminal 25.

Also included in the circuit portion 12 is a first resistance thermometer element 30 which is located within the vacuum pan 1 and which has its resistance determined by the temperature of the sugar soluiton within the pan 1. The element 30 is connected in series with a resistor 31 between the bridge energizing terminal 18 and the bridge output terminal 25.

A fourth resistor 32 is connected in series with a resistor 33 between the bridge output terminals 25 and 26. The resistor 32 is the rebalancing slide wire resistor of the apparatus, as will be discussed more fully hereinafter.

The second circuit portion 13 includes a second resistance thermometer element 34 which is located within the pilot pan 2 and which has its resistance determined by the temperature of the boiling water in the pan 2. The element 34 is connected in series with a fifth resistor 35 and a resistor 36 between the terminal conductors 37 and 38 of a second secondary winding 39 of the transformer 21. A sixth resistor 40 is connected in parallel with the resistor 35. The circuit portion 14 comprises a seventh resistor 41 directly connected between the terminal conductors 37 and 38 of the energizing winding 39. Thus, the second and third circuit portions of the Fig. 1 apparatus are both energized from the same source of voltage, and may indeed be considered to form a second bridge circuit in the apparatus.

The three circuit portions of the apparatus which have been described are interconnected with each other and with the current detector amplifier 15 by a plurality of conductors which make connections to the circuit portions by means of adjustable contacts located on certain of the resistors included in the circuit portions. As will be explained more fully hereinafter, certain of these adjustable contacts cooperate in forming the novel means by which the apparatus may be adjusted for different purities of the sugar solution in the vacuum pan 1.

The interconnections between the several circuit portions of the Fig. 1 apparatus include contacts 42, 43, 44, and 45 which are respectively in engagement with and adjustable along the resistors 32, 27, 41, and 35. A conductor and collector wire 46 connects the contact 42 to one input terminal 47 of the amplifier 15, the other input terminal 48 of which is connected by a conductor 49 to the contact 45. A conductor 50 is connected between the contacts 43 and 44.

As is apparent from Fig. 1, the connections just described cause the circuit portions 12, 13, and 14 to be connected in a series circuit which includes the input of the amplifier 15. Specifically, this series circuit can be traced from the contact 42 through the conductor 46, the input of the amplifier 15, and the conductor 49 to the contact 45, and thence through the portion 13, the terminal conductors 37 and 38, and the portion 14 to the contact 44. From there the circuit extends through the conductor 50 to the contact 43, and thence through the circuit portion 12 and the resistors 32 and 33 back to the contact 42.

As was previously mentioned, the resistor 32 is the rebalancing slide wire resistor of the apparatus, and the adjustable contact 42 of this resistor is thus arranged to be adjusted along the resistor 32 as necessary to maintain substantially zero current flow through the input of the amplifier 15. This then causes the adjusted position of the contact 42 along the resistor 32 to be a measure of the degree of supersaturation of the sugar solution within the vacuum pan 1 as will be more fully discussed hereinafter. To this end, the contact 42 is associated with a pointer 51 and scale 52 which cooperate to provide an indication of the measured supersaturation. The contact 42 and pointer 51 are mounted on a carriage 53 which is adapted to be adjusted along the resistor 32 and scale 52 by a drive shaft 54. The latter is arranged to be driven through a mechanical linkage 55 from the rotor 17 of the motor 16 in the conventional manner.

Also mounted on the carriage 53 is a marking element or pen 56 which cooperates with a record sheet or chart 57 to provide a record of the measured supersaturation. The chart 57 is advanced in accordance with time by a chart drive motor 58 in the usual way.

As was previously noted, the motor 16 is controlled by the amplifier 15 in accordance with the magnitude and phase of the signal applied to the input of the amplifier 15. To this end, the motor 16 includes a control winding 59 and a power winding 60. The winding 59 is connected to and energized from output terminals 61 and 62 of the amplifier 15, while the winding 60 is energized directly from the alternating current supply conductors 23 and 24. Thus, one end of the winding 60 is directly connected through a conductor 63 to the supply conductor 23, while the other end of the winding 60 is connected through a condenser 64 and a conductor 65 to the supply conductor 24. The conductors 63 and 65 are also connected to energizing terminals 66 and 67 of the amplifier 15 for supplying energizing current thereto.

Since the null detecting and apparatus rebalancing arrangement just described is of a well-known type which is shown, for example, in the Wills Patent No. 2,423,540, it is considered to be sufficient to note herein in connection with this portion of the Fig. 1 apparatus that, when there is no potential difference between the adjustable contacts 42 and 45, and hence no current flow in the input circuit of the amplifier 15, the motor 16 and contact 42 remain stationary. This is the balanced condition of the apparatus. Any change in the apparatus which causes the development of a potential difference between the contacts 42 and 45, thereby causing an alternating current signal to be applied to the input of the amplifier 15 and hence causing a current to flow in this input, causes the motor 16 to move the contact 42 along the resistor 32 in a direction dependent upon the phase of the signal applied to the amplifier input relative to the phase of the supply voltage between the conductors 63 and 65. The contact 42 is thus moved in the direction and to the extent necessary to return the amplifier input signal to zero and hence to rebalance the apparatus. Thus, the rebalanced position of the contact 42 is indicative of the conditions in the apparatus at any given time.

The manner in which the adjusted position of the contact 42 along the resistor 32 is made to correspond to the then existing value of the supersaturation of the sugar solution in the vacuum pan 1 will now be described. As was previously noted, the element 30 in the bridge circuit portion 12 is responsive to the temperature of the boiling sugar solution, while the element 34 in the circuit portion 13 is responsive to the temperature of the water boiling in the pilot pan 2 under the same pressure as the sugar solution. Accordingly, the output of the bridge circuit 12 between the terminals 25 and 26 is a function of the sugar solution temperature, while the output of the circuit portions 13 and 14 between the contacts 44 and 45 is a function of the temperature of the boiling water in the pilot pan 2. Since the rebalancing resistor 32 is connected between the bridge output terminals 25 and 26, the signal between the contacts 42 and 43 is a fraction of the bridge output signal, the value of this fraction being determined by the adjusted position of the contact 42 along the resistor 32, and by the adjusted position of the contact 43 along the resistor 27. Thus, the previously described series circuit connection between the amplifier input terminals 47 and 48 of the circuit portions connected between the adjustable contacts 42, 43, 44, and 45 causes the signal from the portion 12 between the adjustable contacts 42 and 43 to be applied to the amplifier input in series opposition to the signal from the portions 13 and 14 between the adjustable contacts 44 and 45. To this end, the energizing windings 20 and 39 are arranged to have the instantaneous polarities shown by the plus signs adjacent the left-hand ends of these windings in Fig. 1.

With the circuit arrangement just described, and assuming that the apparatus has been adjusted in accordance with the purity of the sugar solution in the vacuum pan 1 in the manner to be described hereinafter, the adjusted position of the contact 42 for the balanced condition of the apparatus is a measure of the supersaturation of the sugar solution. In other words, for any given adjusted position of the contacts 43, 44, and 45, which position will have been made to correspond to the value of the purity of the sugar solution as will be described below, the balanced position of the contact 42 is indicative of the solution supersaturation. Any change in this supersaturation to a new value causes the apparatus to become unbalanced, and hence results in the application of an input signal to the amplifier 15, and in the operation of the motor 16 as necessary to reposition the contact 42 so as to rebalance the apparatus and return the value of the amplifier input signal to zero. When this rebalancing procedure has been accomplished, the new position of the contact 42 is indicative of the new value of the solution supersaturation.

As has been mentioned previously herein, the supersaturation measuring apparatus of Fig. 1 must be adjusted in accordance with the purity of the sugar solution in the vacuum pan 1 if the contact 42 and cooperating pointer 51 and pen 56 are to be positioned accurately in accordance with the actual degree of supersaturation of the sugar solution. The reason for this is that the value of the purity of the solution affects the temperature and resistance of the element 30 even though the actual solution supersaturation value remains constant. In other words, for any given value of solution supersaturation, different degrees of solution purity cause the element 30 to be subjected to different temperatures. Therefore, if the apparatus were not provided with means for adjusting the latter in accordance with the solution purity, the adjusted position of the contact 42 would be determined by the purity of the solution as well as the supersaturation thereof. This would mean that different solution purities would cause the pointer 51 to be positioned at different points along the supersaturation scale 52 even though the actual supersaturation value of the solution remained constant. Accordingly, it is apparent that apparatus of the type illustrated in Fig. 1 must be provided with means by which compensation of the apparatus may be effected for different solution purities in order that a given solution supersaturation will always cause the pointer 51 to be positioned at the same point on the supersaturation scale 52 no matter what the degree of purity of the solution within the operating range of the apparatus.

The novel means by which the apparatus of Fig. 1 can be adjusted in accordance with the solution purity will now be described in detail. As previously noted, the adjustable contacts 43, 44, and 45 on the respective resistors 27, 41, and 35 are made adjustable in the apparatus for this purpose of providing a novel means by which the apparatus may be adjusted at any time for the then existing value of the solution purity. In addition to the contacts 43, 44, and 45, the purity adjusting means includes an adjustable contact 68 which is adjustable along the resistor 40 and which is connected to one end of the latter.

For the purpose of causing a given solution supersaturation value to cause the apparatus always to position the contact 51 to the same point on the supersaturation scale 52 for different purities of the solution, it is necessary not only to make the contacts 43, 44, 45, and 68 adjustable, but also to arrange the contacts and their cooperating resistors in such a manner that the resistances between the several contacts and their resistors bear a predetermined relationship for each different solution purity within the range of the instrument. To facilitate this proper relative adjustment of the contacts 43, 44, 45, and 68 to correspond to the existing purity of the solution under measurement, these contacts are manually interconnected by a mechanical linkage 69 provided with a manually adjustable purity setting knob 70. By means of the linkage 69, the manual rotation of the knob 70 causes each of the contacts 43, 44, 45, and 68 to be moved along its cooperating resistor. Moreover, these contacts and resistors are so relatively arranged that each purity position of the knob 70 causes the value of the resistance between each of the adjustable contacts and the ends of the associated resistor to have both the required absolute and relative values necessary to cause the apparatus to provide accurate indications of the solution supersaturation, throughout the range of the apparatus, for the particular solution purity to which the knob 70 has been adjusted. The proper adjustment of the knob 70 may be facilitated by the use of a cooperating pointer 71 and purity calibrated scale 72.

Each of the resistors 27, 35, 40, and 41 together with its respective contacts 43, 45, 68, and 44 may be considered as being an adjustable resistor of the purity compensating means included in the Fig. 1 apparatus. However, the maintenance of the proper relative adjusted resistances of these resistors for different purity values requires that these resistances change in a non-linear manner as the knob 70 is adjusted successively from one purity position to the next. While this proper non-linear relative adjustment of the resistors 27, 35, 40, and 41 may be effected mechanically by suitably designing the linkage 69 to cause the contacts 43, 44, 45, and 68 to move in the required non-linear manner as the knob 70 is adjusted, I prefer to perform this step electrically by the appropriate design of the resistors themselves. This makes it possible to utilize a simple linkage 69 which merely advances the contacts 43, 44, 45, and 68 simultaneously and linearly as the knob 70 is adjusted, but permits the resistance adjustments to be effected in the desired relative manner.

A preferred form for the purity compensating resistors 27, 35, 40, and 41 of Fig. 1 is shown in Fig. 2. In this arrangement, each adjustable resistor is in the form of a single pole, multi-position switch whose stationary contacts are interconnected in the desired manner by a plurality of fixed resistors having desired values. The movable contact of the switch constitutes the adjustable resistor contact shown diagrammatically in Fig. 1. Thus, the adjustable resistor 27 of Fig. 1 is shown in Fig. 2 as including twelve fixed resistors 27A through 27L, inclusive, connected in series between the terminals 18 and 26, which terminals constitute the extremities or end terminals of the resistor 27. Each of the junctions between the adjacent ones of the resistors 27A through 27L is connected to a respective one of the eleven stationary contacts of the switch included as a part of adjustable resistor 27. The purity scale 72 is advantageously provided with eleven discreet purity points corresponding to eleven solution purity values for which the apparatus is designed to be compensated. As the knob 70 and pointer 71 are manually advanced successively from the first purity scale point to the least, the linkage 69 adjusts the contact 43 progressively from the left to the right in Fig. 2 over the eleven switch contacts connected to the fixed resistors 27A through 27L.

The adjustable resistor 41 also comprises an eleven position switch mechanism whose stationary contacts are connected by a plurality of fixed resistors. Specifically, a resistor 41A is conected between the conductor 37, constituting the left-hand end terminal of the resistor 41 in Figs. 1 and 2, and a point 73. Six resistors 41B through 41G are connected in series between the point 73 and a point 74. Also connected between the points 73 and 74 is a resistor 41H. Further, four resistors 41I through 41L are connected in series between the points 73 and 74. Finally, a resistor 41M is connected between the point 74 and the conductor 38 which constitutes the right-hand end terminal of the resistor 41 in Figs. 1 and 2.

The eleven stationary contacts of the switch mechanism included in the adjustable resistor 41 are connected as follows. The first or left-hand contact is connected to the point 73, while the next five contacts extending toward the right are respectively connected to adjustable points on the resistors 41B through 41F. The next or seventh contact is connected to the point 74, and the remaining four contacts extending toward the right are respectively connected to adjustable points of the resistors 41I thruogh 41L. The points on the resistors 41B through 41F and 41I through 41L are advantageously made adjustable so that the effective resistance values connected to the stationary switch contacts can be slightly adjusted, if necessary, when the apparatus is first placed in operation. After this initial calibrating adjustment, it should not be necessary to make further adjustment of these points along the corresponding resistors.

As in the case of resistor 27, progressive rotation of the knob 70 causes the contact 44 to engage the cooperating stationary switch contacts progressively and simultaneously as the contact 43 progressively engages the corresponding ones of its cooperating contacts. Thus, as the knob 70 is advanced from its first to its last scale position, the adjustable contacts 43 and 44 progressively move to the right in Fig. 2 and successively engage their first, second, third, etc. stationary contacts in syncronism.

The adjustable resistor 35 includes twelve fixed resistors 35A through 35L connected in series between its left-hand and right-hand end terminals. The left-hand end terminal of resistor 35 is the terminal shown connected to the resistor 36 in Fig. 1, while the right-hand terminal of resistor 35 is shown in Fig. 1 as being connected to the conductor 38. In the resistor 35, the first or left-hand stationary switch contact is connected to the junction between the resistors 35A and 35B, while the second switch contact, progressing toward the right, is connected to the junction between the resistors 35B and 35C. The third switch contact is connected to the junction between the resistors 35D and 35E, while the fourth contact is connected to the junction between the resistors 35F and 35G. The fifth contact is connected to the junction between the resistors 35H and 35I, while the sixth contact is connected to the junction between the resistors 36J and 35K. The seventh contact is connected to the junction between the resistors 35K and 35L, while the eighth contact is connected to the junction between the resistors 35I and 35J. Finally the ninth, tenth, and eleventh contacts are respectively connected to the junctions between the resistors 35G and 35H, 35E and 35F, and 35C and 35D. By means of the mechanical linkage 69, the contact 45 is adjusted over its cooperating stationary contacts in synchronism with the adjustment of the contacts 43 and 44.

The resistor 40 includes a group of eleven fixed resistors 40A through 40K which are connected in series between the left-hand and right-hand end terminals of the resistor 40. The left-hand terminal of the resistor 40 is connected to the resistor 36 as shown in Fig. 1, while the right-hand terminal of the resistor 40 is connected along with the contact 68 to the conductor 38. The first ten of the stationary switch contacts included in the resistor 40 are respectively connected to the junctions between adjacent ones of the resistors 40A through 40K, while the eleventh and last switch contact is connected to the conductor 38 and right-hand terminal of the resistor 40. The adjustable contact 68 moves over its associated stationary contacts in synchronism with the contacts 43, 44, and 45 as the knob 70 is rotated.

It is to be noted that the adjustable resistor arrangement illustrated in Fig. 2 is but one form which the purity compensating portion of the Fig. 1 apparatus may take. Thus, as previously noted, the resistors 27, 35, 40, and 41 may instead be simple slide wire resistors whose contacts are properly relatively moved so as to produce the necessary purity compensating effects. Moreover, other arrangements of fixed resistors and switch contacts, differing from the arrangements of Fig. 2, can be employed. Also, arrangements of the type shown in Fig. 2 having fewer or more than eleven discreet purity points can be employed. Further, specially wound continuous resistors with linearly adjusted contacts can be used as the resistors 27, 35, 40, and 41 in lieu of the fixed or tapped resistors and cooperating switches. The only criterion in each case is that the rotation of the knob 70 or its equivalent must properly change simultaneously the resistances between each of the contacts 43, 44, 45, and 68 and the end terminals of the resistor associated with that contact.

If desired, the four separate eleven-position switches and the interconnecting linkage 69 shown in Fig. 2 can be in the form of a single eleven-position, four-gang, rotary selector switch of any of the many known commercially available forms.

By way of illustration and example, and not by way of limitation, the following Table I lists a set of resistance values for the resistors of Fig. 2 which have been found to be suitable for providing a purity range of 80% to 100% in ten 2% steps.

Table I

| Resistor: | Resistance, ohms |
|---|---|
| 27A | 485.275 |
| 27B | 22.0311 |
| 27C | 20.5772 |
| 27D | 19.2628 |
| 27E | 18.0706 |
| 27F | 16.9859 |
| 27G | 15.9961 |
| 27H | 15.0904 |
| 27I | 14.2596 |
| 27J | 13.4956 |
| 27K | 12.7915 |
| 27L | 72.2932 |
| 35A | 2389.68 |
| 35B | 173.933 |
| 35C | 95.8752 |
| 35D | 15.3294 |
| 35E | 52.8554 |
| 35F | 18.5348 |
| 35G | 28.4088 |
| 35H | 15.0826 |
| 35I | 13.8275 |
| 35J | 8.25512 |
| 35K | 4.11797 |
| 35L | 1184.1 |
| 40A | 324.275 |
| 40B | 99.61179 |
| 40C | 116.187 |
| 40D | 137.414 |
| 40E | 165.215 |
| 40F | 202.617 |
| 40G | 254.617 |
| 40H | 329.948 |
| 40I | 445.025 |
| 40J | 633.777 |
| 40K | 976.162 |
| 41A | approximately 204.517 |
| 41H | do 13.5429 |
| 41M | 86.0031 |

Resistance between contacts of switch of resistor 41:

| | Ohms |
|---|---|
| 1–2 | 20.0426 |
| 2–3 | 16.4375 |
| 3–4 | 12.7645 |
| 4–5 | 8.9252 |
| 5–6 | 4.7989 |
| 6–7 | 0.2306 |
| 7–8 | 4.9897 |
| 8–9 | 11.1568 |
| 9–10 | 18.7049 |
| 10–11 | 28.3002 |
| 11—Point 73 | 0.05 |

In the operation of the supersaturation measuring apparatus of Fig. 1, the knob 70 of the purity compensating means is adjusted manually as necessary to maintain the pointer 71 at the point on the purity dial 72 corresponding to the existing purity of the solution in the vacuum pan 1. This purity value of the solution may readily be ascertained by laboratory analysis or other known means. In this manner, the true degree of supersaturation of the solution in the vacuum pan 1 will be continuously indicated by the position of the pointer 51 on the supersaturation scale 52, notwithstanding the occurrence of changes in the solution purity. Were it not for the provision of the purity compensating means including the resistors 27, 35, 40, and 41 and their respective adjustable contacts 43, 45, 68, and 44, the same degree of supersaturation of the solution would cause the pointer 51 to indicate a different supersaturation value on the scale 52 for each different solution purity.

The rebalancing linkage 55 has been shown in Fig. 1 as being connected to the controller 5 which is arranged to control the operation of the valve 4 located in the sugar solution supply connection 3 of the vacuum pan 1. By means of this arrangement, the controller 5 can be adjusted so that it will, under the control of the position of the contact 42, maintain a desired degree of supersaturation for the solution in the vacuum pan 1 by regulating the addition of raw solution to the solution in the pan.

There is illustrated in Fig. 3 a modification of the apparatus shown in Fig. 1 in which the circuit portion 14 is energized from a source of voltage which is separate from that which energizes the circuit portion 13. Thus, the transformer 21 of the Fig. 1 arrangement is replaced in the Fig. 3 arrangement by a transformer 21' having an additional secondary winding 39'. In Fig. 3, the resistor 41 is not energized from the winding 39 along with the resistors 34, 35, and 40, but instead is connected across and energized from the winding 39'. The above described series relationship between the portions 12, 13, and 14 and the input of the amplifier 15 is maintained in the Fig. 3 apparatus by a conductor 73 which connects the conductor 37 to the left-hand terminal conductor of the winding 39'. Accordingly, this series circuit of the Fig. 3 apparatus can be traced from the contact 42 through the conductor 46, the input of the amplifier 15, and the conductor 49 to the contact 45, then through the circuit portion 13, the conductor 73, and the circuit portion 14 to the contact 44, then from the contact 44 through the conductor 50 and through the contact 43, and finally from the contact 43 through the circuit portion 12 back to the contact 42.

It should be noted in connection with the arrangement of Fig. 3 that it is immaterial in what order the circuit portions 12, 13, and 14 are connected in series in the input of the amplifier 15. Thus, the amplifier input may instead be connected in series with the conductor 50, with the conductors 46 and 49 connected together to connect the contact 42 directly to the contact 45. Instead, the conductor 49 may be connected to the contact 44 instead of to the contact 45, if the conductor 50 is connected to the contact 45 instead of to the contact 44, and the connections to the winding 20 are reversed. It should be apparent that such rearrangement of the elements of the series circuit in no way affects the operation of the apparatus as described in connection with the arrangement illustrated in Fig. 3.

What has just been said basically applies also to the arrangement shown in Fig. 1, wherein the amplifier input, for example, may be connected in series in the conductor 50 instead of between the conductors 46 and 49 as shown. In the Fig. 1 arrangement as in the arrangement of Fig. 3, the criterion is that the circuit portions 12, 13, and 14 be connected in series opposition in the input of the amplifier 15.

By way of illustration and example, and not by way of limitation, the following Table II lists a set of values for the components of the arrangements of Figs. 1 and 3 which have been found to be desirable in providing a saturation measuring range of approximately 85% to 188%. The values for the resistors 27, 35, 40, and 41 corresponding to the values of the other components given in Table II are those values previously given in Table I.

*Table II*

| Resistor | Resistance, ohms |
|---|---|
| 27 | See Table I. |
| 28 | 721.500. |
| 29 | 500. |
| 30 (Res. Ther.) | 658–713. |
| 31 | 10. |
| 32 | 20. |
| 33 | 142.410. |
| 34 (Res. Ther.) | 658–713. |
| 35 | See Table I. |
| 40 | See Table I. |
| 41 | See Table I. |
| Windings 20, 39, 39' | 25 volts each. |

It should be apparent from the foregoing that the apparatus illustrated and described herein constitutes novel supersaturation measuring apparatus including novel means which are readily adjustable to permit the apparatus to be compensated for different purities of the solution under consideration.

Although the term "supersaturation" has been employed throughout the foregoing description to define the quantity which is measured by the apparatus described, it is to be understood that the apparatus is equally as well adapted for the measurement of solution saturations below the supersaturation level: that is, below 100% saturation. In fact, it is noted that the particular embodiment of the apparatus whose component values are listed herein by way of example is stated as having a measuring range of 85–188% saturation, which means that this apparatus was arranged to measure undersaturation (saturations below 100% saturation) as well as supersaturation (saturations above 100% saturation). If desired, the scale of the apparatus can be limited entirely to the undersaturation range or to the supersaturation range, depending upon the purpose for which the particular apparatus is to be used.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. Apparatus for measuring the degree of saturation of a boiling solution, comprising a bridge circuit having a pair of input terminals, a pair of output terminals, and four bridge arms interconnecting said terminals, a first resistance thermometer element connected in one of said arms and adapted to be exposed to the temperature of the boiling solution, first, second, and third resistors respectively connected in each of the others of said arms, energizing conductors connected to said input terminals and adapted to connect the latter across a source of energizing voltage, a fourth resistor connected between said output terminals, a second resistance thermometer element adapted to be exposed to the temperature of the solvent of said solution boiling at substantially the same pressure as said solution, means connecting said second element and a fifth resistor in a series circuit between energizing ductors adapted to be connected across a source of energizing voltage, a sixth resistor connected in parallel with at least a portion of said resistor, a conductor connecting one end of said sixth resistor to a terminal adjustable on the latter, a seventh resistor connected between energizing conductors adapted to be connected across a source of energizing voltage, first and second terminals located in said series circuit and between which there is produced a first voltage, one of said first and second terminals being adjustable on said fifth resistor, third and fourth terminals located on said seventh resistor and between which there is produced a second voltage, one of said third and fourth terminals being adjustable on said seventh resistor, fifth and sixth terminals adjustable, respectively, on said first and fourth resistors and between which there is produced a third voltage, conductor means connecting said first, second, third, and fourth terminals and the portions of said fifth and seventh resistors between these terminals in a series circuit between said fifth and sixth terminals, a current detector connected in series in said conductor means, the polarities of said energizing conductors being so related that the algebraic sum of said first and second voltages is opposite in polarity to said third voltage in the last mentioned series circuit, whereby the algebraic sum of said first and second voltages is applied to said detector in series voltage opposition to said third voltage, means operable to effect the simultaneous adjustment of said adjustable terminals on said first, fifth, sixth, and seventh resistors for adjusting the apparatus in accordance with the purity of said solution, and means operable to adjust said sixth terminal on said fourth resistor and hence to adjust the magnitude of said third voltage as required to make the latter equal in magnitude but opposite in polarity with respect to said algebraic sum of said first and second voltages and thereby reduce the current flow through said detector substantially to zero, the adjusted position of said sixth terminal on said fourth resistor for substantially zero current flow through said detector being a measure of the degree of saturation of said solution.

2. Apparatus as specified in claim 1, wherein said seventh resistor is connected in parallel with the series circuit including said second element and said fifth resistor, and wherein the second mentioned and third mentioned sources of energizing voltage are a single voltage source.

3. Apparatus as specified in claim 2, wherein the first mentioned voltage source is a transformer secondary winding, and wherein said single voltage source is a separate transformer secondary winding.

4. Apparatus as specified in claim 1, wherein each of said sources of energizing voltage is a separate voltage source.

5. Apparatus as specified in claim 4, wherein each of said voltage sources is a separate transformer secondary winding.

6. Apparatus for measuring the degree of saturation of a boiling solution, comprising a bridge circuit having a pair of input terminals, a pair of output terminals, and four bridge arms interconnecting said terminals, a first resistance thermometer element connected in one of said arms and adapted to be exposed to the temperature of the boiling solution, first, second, and third resistors respectively connected in each of the others of said arms, the arms including said first resistor and said first element being adjacent each other and being connected to the same one of said input terminals, first conductors connected to said input terminals and adapted to connect the latter across a source of energizing voltage, a fourth resistor connected between said output terminals, a second resistance thermometer element adapted to be exposed to the temperature of the solvent of said solution boiling at substantially the same pressure as said solution, means connecting said second element and fifth resistor in a series circuit between second conductors adapted to be connected across a source of energizing voltage, a sixth resistor connected in parallel with at least a portion of said fifth resistor, a conductor connecting one end of said sixth resistor to a terminal adjustable on the latter, a seventh resistor connected between third conductors adapted to be connected across a source of energizing voltage, a first terminal connected to one end of said fifth resistor, a second terminal adjustable on said fifth resistor, whereby there is produced between said first and second terminals a first voltage, a third terminal connected to one end of said seventh resistor, a fourth terminal adjustable on said seventh resistor, whereby there is produced between said third and fourth terminals a second voltage, fifth and sixth terminals adjustable, respectively, on said first and fourth resistors and between which there is produced a third voltage, a conductor connecting said first terminal to said third terminal, a conductor connecting said fourth terminal to said fifth terminal, a current detector connected between said second and sixth terminals, the polarities of said first, second, and third conductors being so related that the algebraic sum of said first and second voltages is applied to said detector in series voltage opposition to said third voltage, means operable to effect the simultaneous adjustment of said adjustable terminals on said first, fifth, sixth, and seventh resistors for adjusting the apparatus in accordance with the purity of said solution, and other adjusting means operable to adjust said sixth terminal on said fourth resistor and hence to adjust the magnitude of said third voltage as required to make the latter equal in magnitude but opposite in polarity with respect to said algebraic sum of said first and second voltages and thereby reduce the current flow through said detector substantially to zero, the adjusted position of said sixth terminal on said fourth resistor for substantially zero current flow through said detector being a measure of the degree of saturation of said solution.

7. Apparatus as specified in claim 6, wherein said seventh resistor is connected in parallel with the series circuit including said second element and said fifth resistor, and wherein said first and second conductors are thereby adapted to be connected across the same source of energizing voltage.

8. Apparatus as specified in claim 7, wherein the first mentioned voltage source is a transformer secondary winding, and wherein said same source of energizing voltage is a separate transformer secondary winding.

9. Apparatus as specified in claim 6, wherein each of said sources of energizing voltage is a separate voltage source.

10. Apparatus as specified in claim 9, wherein each of said voltage sources is a separate transformer secondary winding.

11. Apparatus as specified in claim 6, wherein said sixth terminal adjustable on said fourth resistor is a sliding contact engaging and adjustable along said fourth resistor, and wherein said detector includes mechanism mechanically coupled to said other adjusting means and operative upon the occurrence of current flow through said detector to adjust said sliding contact to a position along said fourth resistor at which said current flow is reduced substantially to zero.

References Cited in the file of this patent

UNITED STATES PATENTS 2,263,847    Holven _____ Nov. 24, 1941